April 12, 1960 D. W. KERST ET AL 2,932,798
IMPARTING ENERGY TO CHARGED PARTICLES
Filed Jan. 5, 1956 9 Sheets-Sheet 1

INVENTORS
DONALD W. KERST
KEITH R. SYMON
BY Harold T. Stowell
ATTORNEY

INVENTORS
DONALD W. KERST
KEITH R. SYMON
BY Harold T. Stowell
ATTORNEY

April 12, 1960 D. W. KERST ET AL 2,932,798

IMPARTING ENERGY TO CHARGED PARTICLES

Filed Jan. 5, 1956 9 Sheets-Sheet 3

INVENTORS

DONALD W. KERST

KEITH R. SYMON

BY Harold T. Stowell

ATTORNEY

INVENTORS
DONALD W. KERST
KEITH R. SYMON
BY Harold T. Stowell
ATTORNEY

April 12, 1960 D. W. KERST ET AL 2,932,798

IMPARTING ENERGY TO CHARGED PARTICLES

Filed Jan. 5, 1956 9 Sheets-Sheet 5

INVENTORS
DONALD W. KERST
KEITH R. SYMON

BY Harold T. Stowell

ATTORNEY

April 12, 1960 D. W. KERST ET AL 2,932,798

IMPARTING ENERGY TO CHARGED PARTICLES

Filed Jan. 5, 1956 9 Sheets-Sheet 6

INVENTORS
DONALD W. KERST
KEITH R. SYMON
BY Harold T. Stowell
ATTORNEY

INVENTORS
DONALD W. KERST
KEITH R. SYMON

BY Harold T. Stowell
ATTORNEY

INVENTORS
DONALD W. KERST
KEITH R. SYMON
BY Harold T. Stowell
ATTORNEY

INVENTORS
DONALD W. KERST
KEITH R. SYMON
BY Harold T. Stowell
ATTORNEY 2,932,798

IMPARTING ENERGY TO CHARGED PARTICLES

Donald W. Kerst, Champaign, Ill., and Keith R. Symon, Madison, Wis., assignors to Research Corporation, New York, N.Y., a corporation of New York Application January 5, 1956, Serial No. 557,594

15 Claims. (Cl. 328—235)

This invention relates to a method and apparatus for imparting energy to charged particles.

A copending application of Keith R. Symon, Serial No. 556,897, filed January 3, 1956, describes the general principles of particle accelerators in which charged particles are injected into a focussing field which varies spatially periodically in azimuth about the orbital path of the particles whereby the particles are maintained in the orbital path in spite of their changing energy as a time-variant accelerating electric field is impressed on the particles. Such accelerators are designated "fixed field alternating gradient" (FFAG) accelerators. The said application also particularly describes a form of such accelerators in which the focussing fields are produced by a plurality of pairs of D.C. magnets, the field of each magnet of a pair being opposite in polarity so that the focussing field alternates periodically in azimuth about the orbital path of particles in the field. The focussing fields preferably increase in strength with increasing radius so that a low-energy particle started in its orbit at the inside radius of the field will seek the position of higher energy orbits at larger radii as it is accelerated.

It is evident that beam current output can be much greater from such an accelerator than it would be from a conventional accelerator, because the magnets are at all times able to guide particles of any energy, whereas the conventional accelerator can not contain particles with a large difference of energy as they must have a magnetic field which rises as the momentum of the particle increases. Thus the conventional accelerator can give intermittent bursts of particles only when the magnets are pulsed. The intensity of a FFAG accelerator is determined mainly by the rapidity with which the radio frequency modulation cycle can be repeated. This can be done at least ten times more frequently than the pulsing rate of a conventional A.G. accelerator and, therefore, will give at least ten times as much average beam current.

The advantages which a fixed-field accelerator offers are:

(*a*) Remanence and saturation difficulties with the iron are reduced, since such effects can be avoided by the use of correcting shims;
(*b*) Eddy-current distortions of the field disappear;
(*c*) Use of laminated magnet construction is not required;
(*d*) A metallic vacuum chamber can be employed without distortion of the field;
(*e*) Complex switching gear and the high voltages associated with pulsed operation are avoided;
(*f*) The frequency modulation program for the R.-F. accelerating field is less critical;
(*g*) Low injection energies are possible (i.e., 5 to 10 mev. instead of 50 mev.);
(*h*) High intensity is realizable by the use of more frequent repetition of the acceleration cycle.

In the present invention the advantages of the fixed field machines are retained and certain disadvantages of the alternating field radial sector types of such machines, particularly the substantial increase in circumference over conventional accelerators of comparable energy levels, are avoided by providing focussing fields which have a major field component strongly increasing with radius and minor components varying in gradient both with radius in azimuth about the orbital paths.

In the FFAG particle accelerators of the present invention, alternate-gradient focussing is achieved with no marked increase in circumference by introducing a spatial ripple or flutter into the guide field, so that the orbiting particles encounter regions in which the restoring forces alternate. This is effected by establishing a field which, in comparison with the average field at that radius, is alternately higher and lower along oblique high field and low field loci which all particles must cross. Such a field can be provided by the use of spiral ridges on or adjacent the pole surfaces, supplemented when required by similarly disposed current-carrying conductors. The ratio of the maximum value of the added spiral field component to the adjacent minimum value of the field is termed the flutter factor of the field.

The magnet of the invention is made with the highest magnetic field portion of the gap at the large radius and with the average field increasing very rapidly with radius. High energy particles thus travel around the outside rim, and injected low energy particles travel around the inside rim. This increase of field with radius produces very strong radial focussing forces, but at the same time it causes vertical defocussing. To overcome the vertical defocussing, alternating gradient focussing forces are supplied by spirally ridging the surfaces of the poles so that although the average strength of field increases with radius, there are regions through which the particle passes where the field actually decreases with radius. Since these ridges pass diagonally over the pole face, then the particle will be passing through the region of negative field gradient when its path is at the outside of a ridge. Farther along the orbit the particle will find itself on the inner side of the ridge because the ridge has spiralled out. Here the field gradient is positive. Thus the orbit takes the particle through regions of alternating field gradient. As the energy of the particle increases, the particle moves outward where the field is higher and where the ridges produce a proportionately larger field variation. In this way acceleration to high energy can occur with the particles always in the same type of field configuration. In such a field particles of a definite energy will not possess an equilibrium orbit which is circular but will rather follow about an orbit whose departure from a circle is, in fact, close to sinusoidal.

The principles of the invention may be advantageously applied to a wide variety of existing types of particle accelerators such as synchrotrons, betatrons, and cyclotrons.

The invention will be more particularly described with reference to the accompanying drawings in which.

Figure 6:
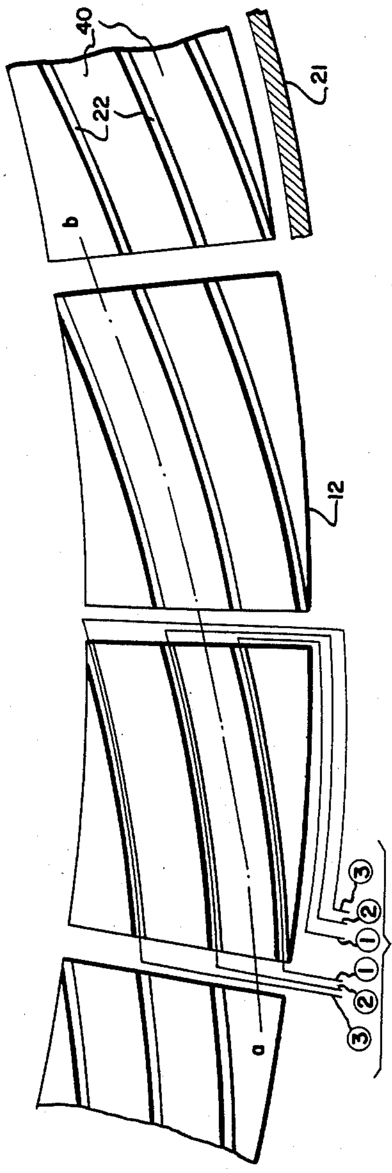
Fig. 6 is a diagram in radial plan view of a method of winding scheme for the magnets of the invention.
Figure 6A:
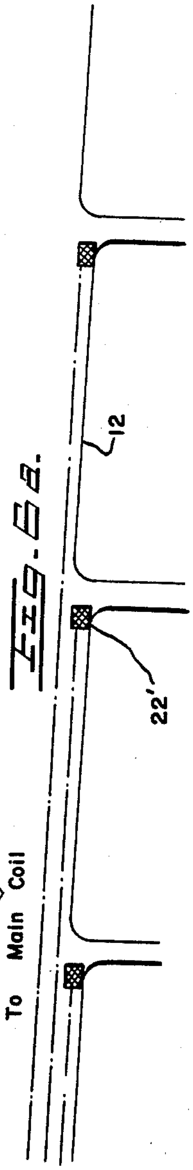
Figure 6B:
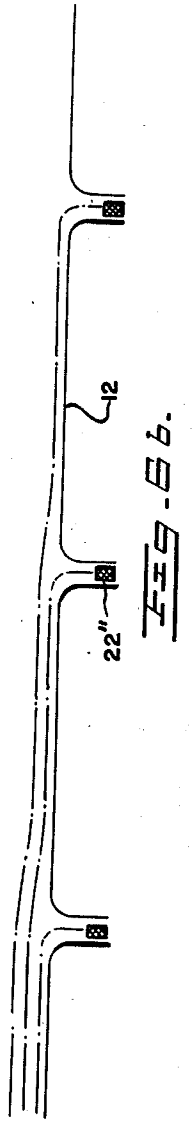
Figure 7:
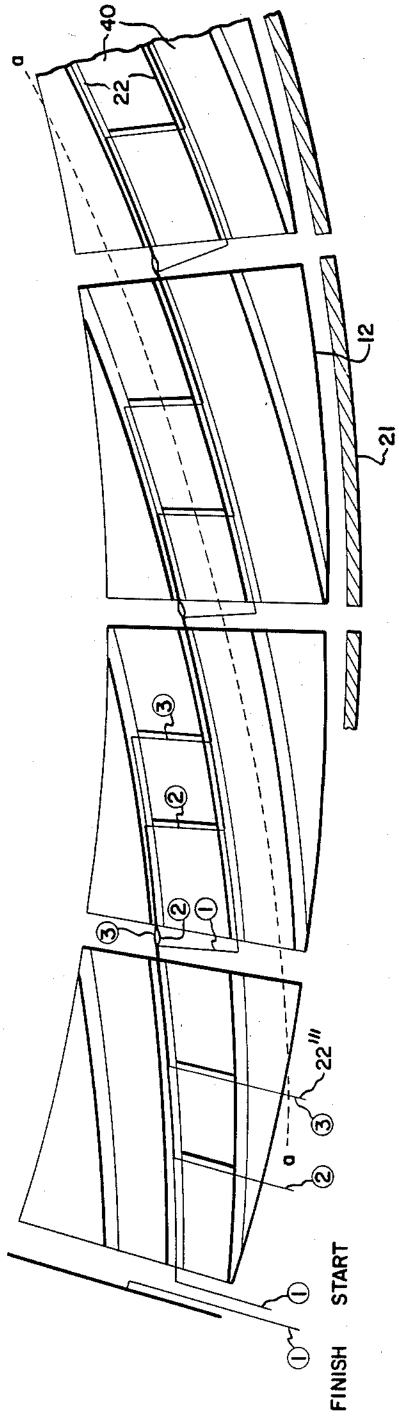
Figure 7A:
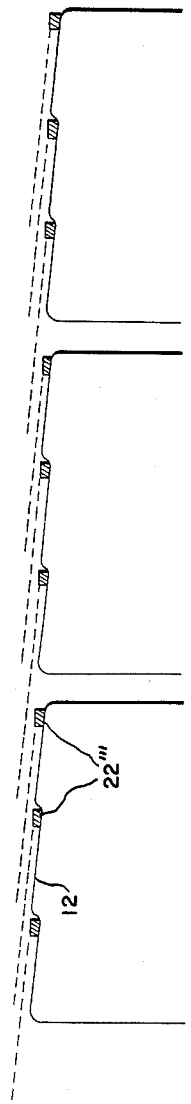
Figure 8:
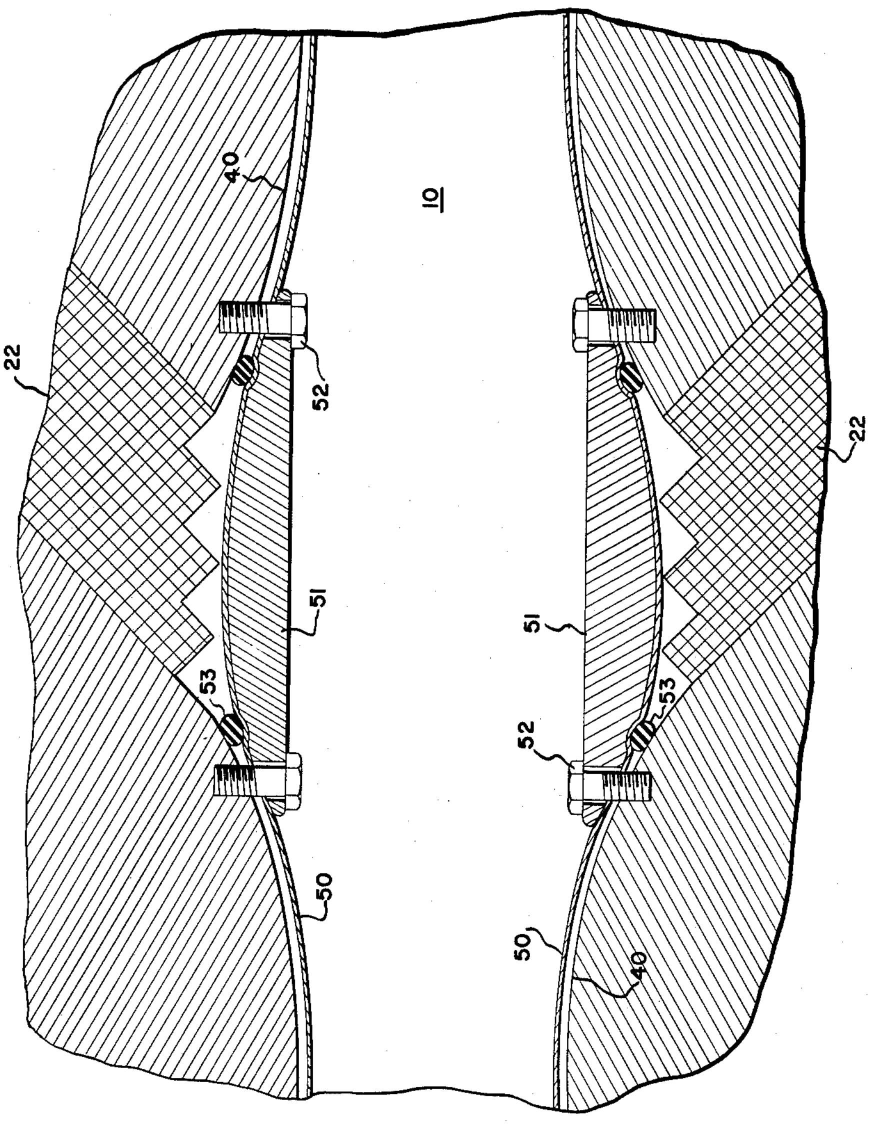
Figure 9:
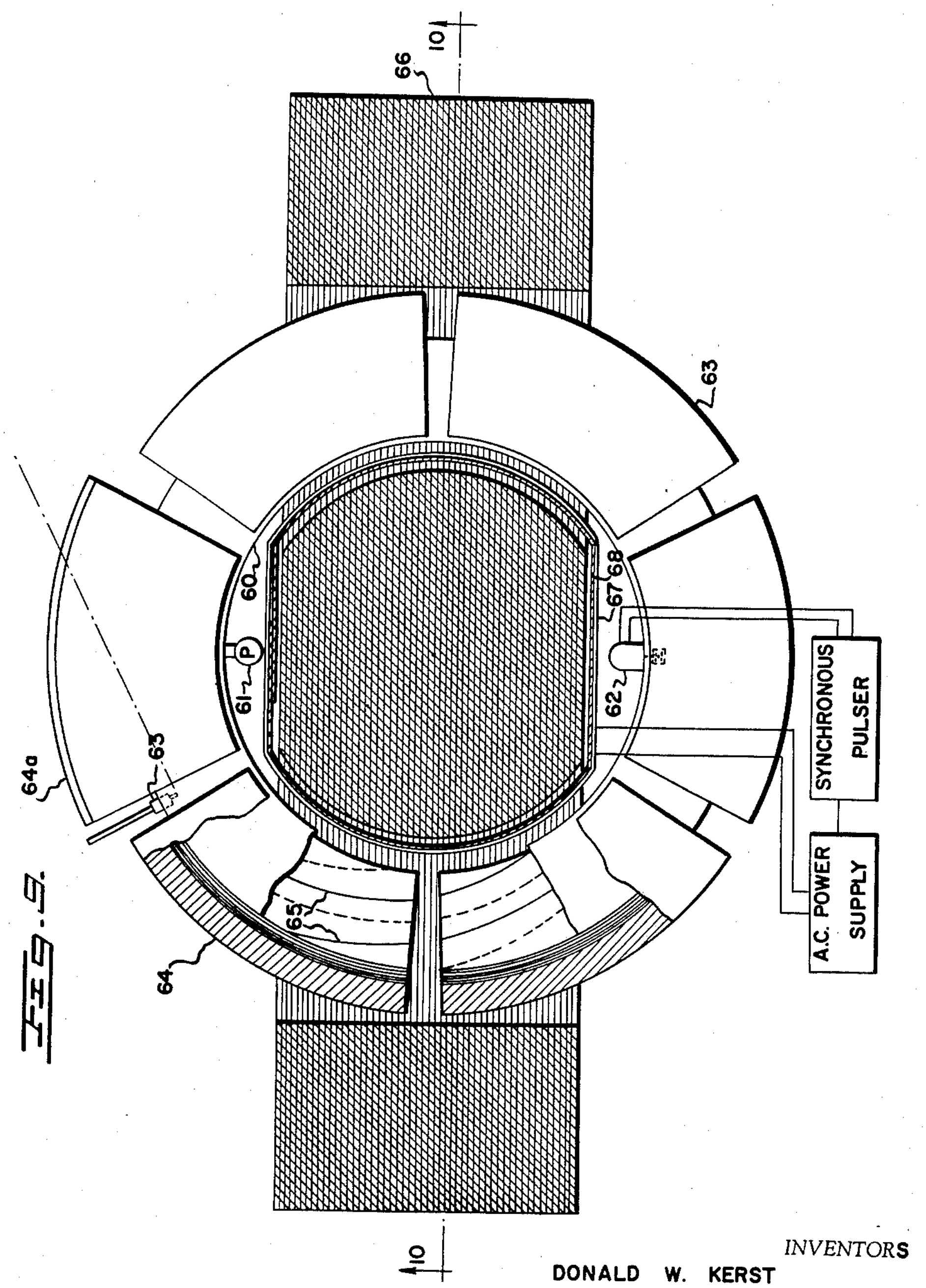
Figure 10:
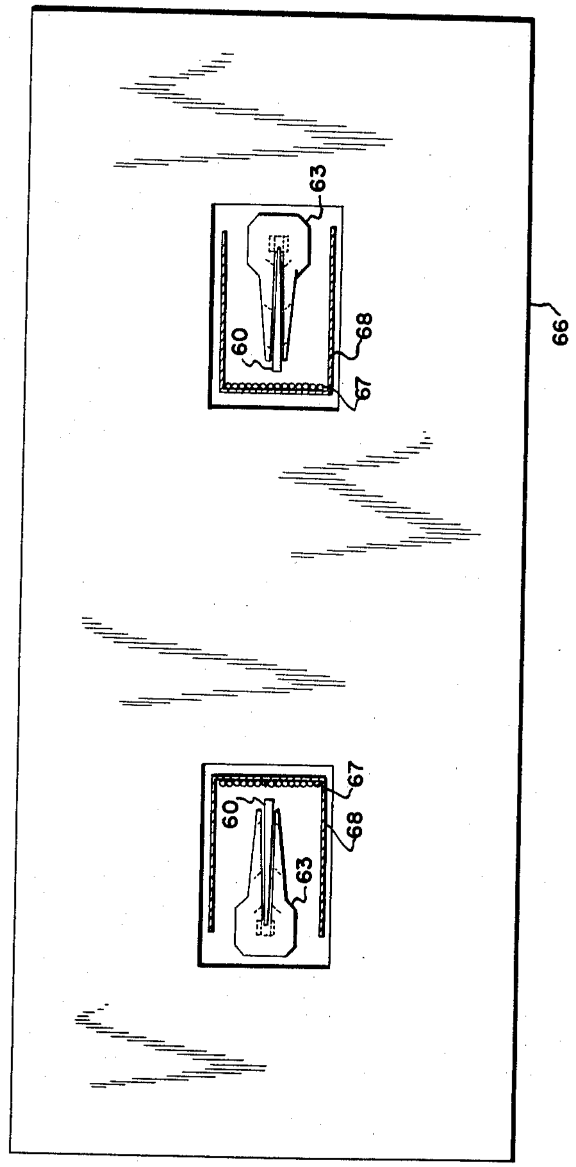
Figure 11:
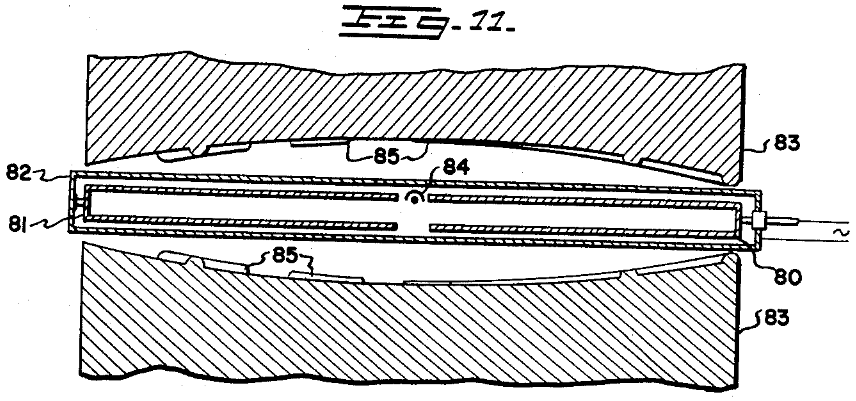
Figure 12:
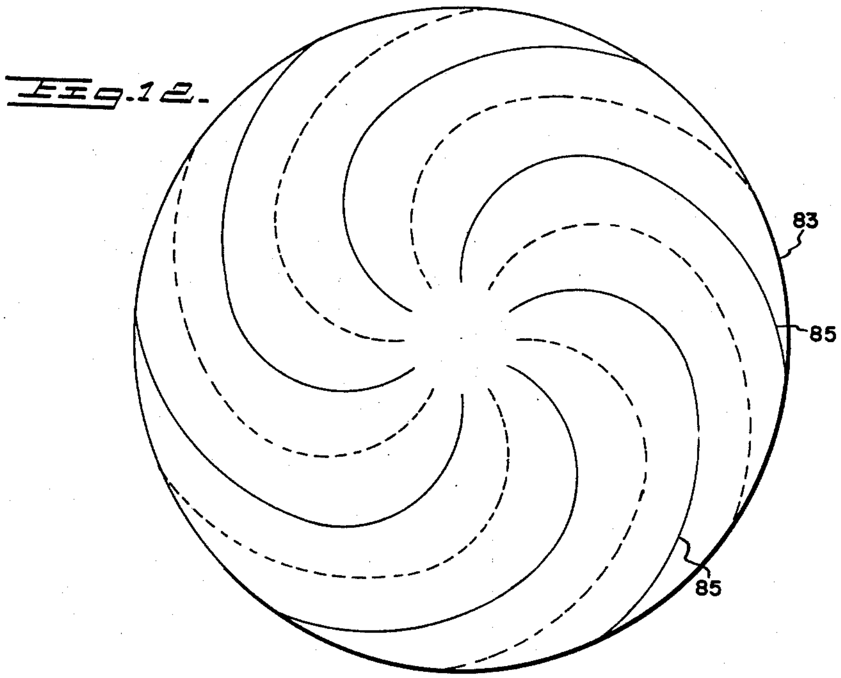

Figs. 6*a* and 6*b* are diagrammatic sections along line a—b of Fig. 6 showing alternative coil arrangements;

Fig. 7 is a diagram in radial plan view of another winding scheme;

Fig. 7a is diagrammatic section along line a—a of Fig. 7;

Fig. 8 is a fragmentary radial section of the poles of a magnet sector showing a method of positioning and supporting the vacuum chamber of the accelerator;

Fig. 9 is a horizontal section through a betatron embodying the principles of the invention;

Fig. 10 is a vertical section on line 10—10 of Fig. 9;

Fig. 11 is a diagrammatic fragmentary sectional view of a cyclotron embodying the principles of the invention;

Fig. 12 is a view of a magnet pole face of the cyclotron of Fig. 11; and

Figure 13:
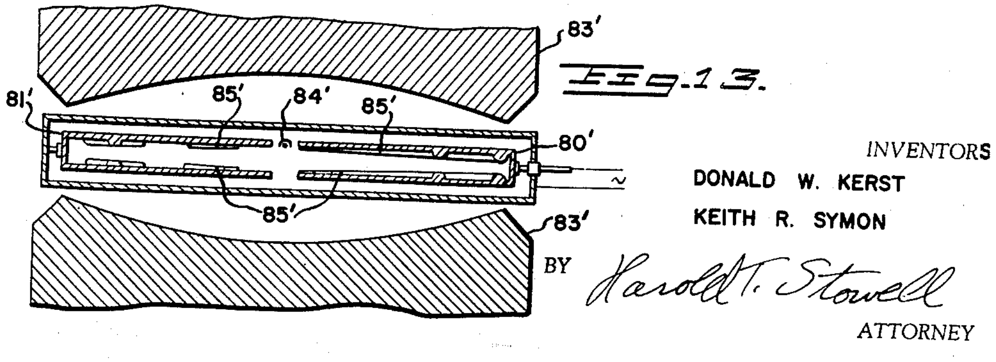

Fig. 13 is a diagrammatic fragmentary sectional view of another form of cyclotron embodying the invention.

Figure 1:
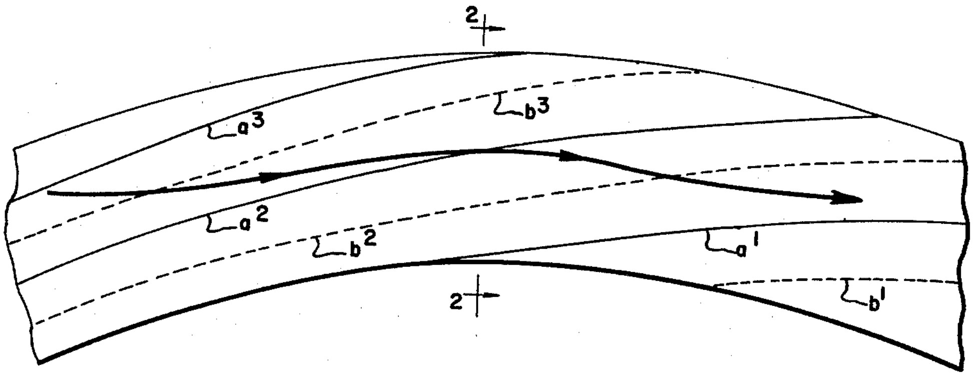
Fig. 1 is a diagrammatic representation of a portion of a focussing field showing a typical particle orbit.

Fig. 1 is a diagrammatic representation of the spirally varying field of the invention showing peaks (a) and troughs (b) of the pole face and a typical equilibrium orbit of a charged particle in the field. The equilibrium orbits are all similar figures whose linear dimensions are proportional to the radius, but their positions rotate with radius due to the spiralling component of the field.

Figure 2:
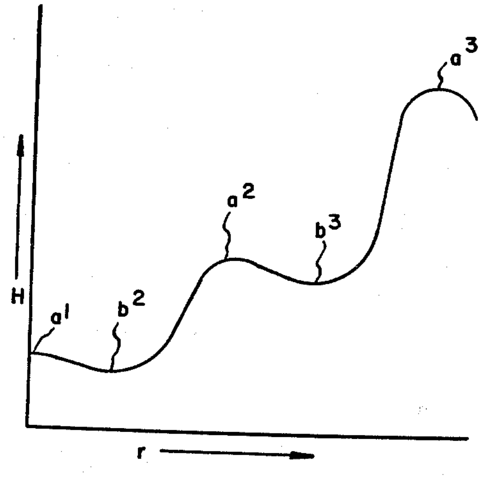
Fig. 2 is a graph showing the form of variation of field strength with radius in the field of Fig. 1.

Fig. 2 shows the variation of field strength (H) with radius (r) in a radial direction. A particle going around the machine experiences a gradient first of one sign then the oppoiste as it crosses the periodic field peaks and troughs at a small angle, so there is A.G. focussing of the betatron oscillations. The negative gradient is less than the positive gradient, due to the radial increase of field. This is somewhat compensated by the scalloping of the orbits, which causes the particle to experience a longer path in the negative gradient and a shorter path in the positive gradient than if it moved on a circle. The strength of betatron focussing depends on the rate of radial increase of the field, the spiral angle, and the number of sectors. The minimum size of radial aperture is limited primarily by the difficulty of achieving strong A.G. focussing with a periodic field while providing a given vertical aperture. A flutter factor of 1/4 gives the largest vertical gap for a fixed strength of focussing when iron magnet poles are used without distributed backwindings and forward windings. This small flutter factor means the machine has a circumference factor close to unity, so the radius of an FFAG spiral sector synchrotron is about the same as that of a conventional synchrotron of equivalent energy. A typical radial aperture for reasonable parameters is about 3% of the radius.

By varying the geometry of the ridges, larger gaps may be achieved with flutter factors substantially larger than 1/4 although, in general, such designs involve a substantial increase in the circumference factor.

Figure 3:
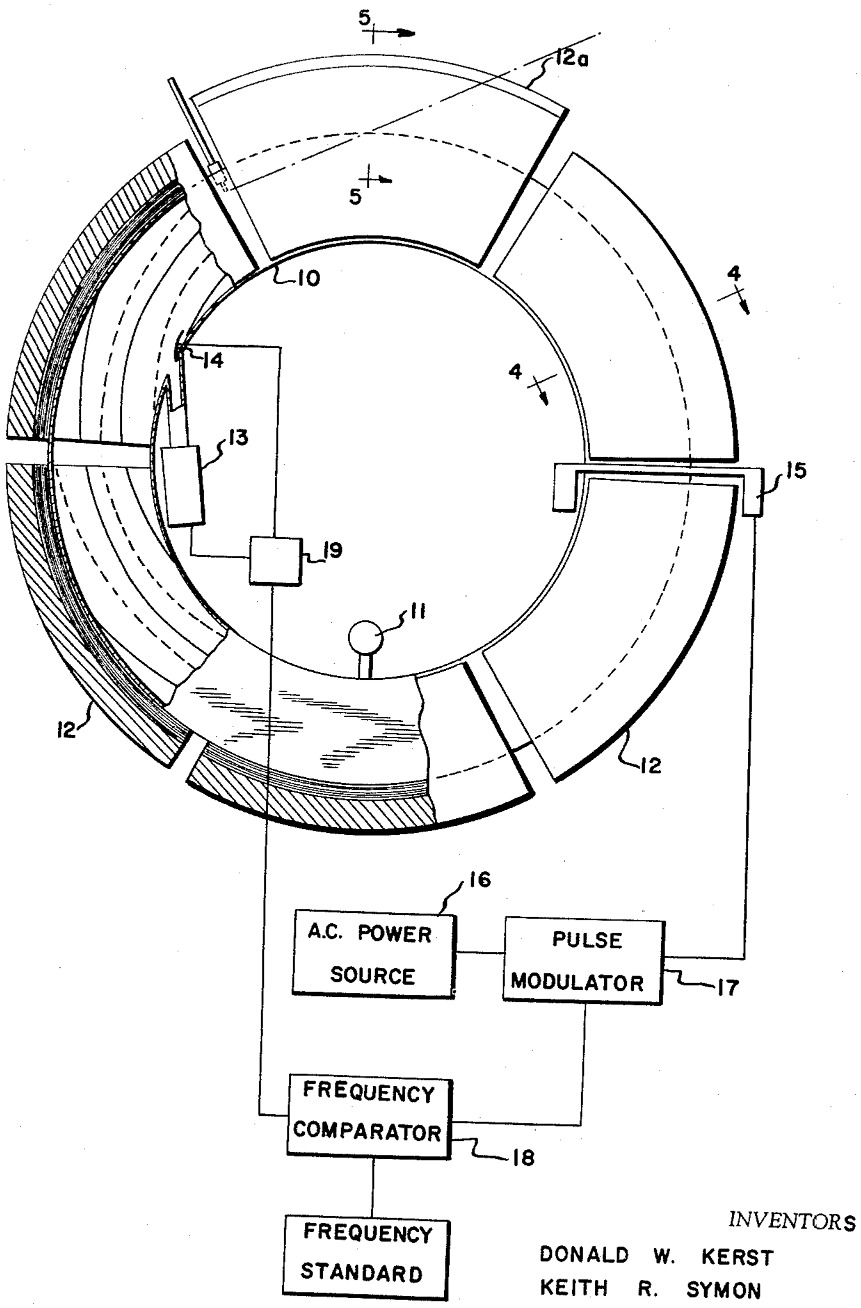
Fig. 3 is a diagrammatic representation in plan view with parts broken away of a synchrotron type particle accelerator embodying the principles of the invention.

Fig. 3 shows a synchrotron type accelerator embodying the principles of the invention. The machine comprises an annular orbit chamber 10 which may be evacuated by one or more vacuum pumps 11. Positioned about chamber 10 is a ring of magnet sectors 12, 12a (Figs. 4 and 5) with the chamber 10 between the pole faces of the magnet. A particle accelerator 13, such as a Van de Graaf accelerator, supplies low energy particles to the inner ring of the chamber 10 and an inflector electrode 14 is provided to bend the injected particles into the low-energy orbit.

One or more cavity resonators, such as resonator 15, having a central opening through which the vacuum chamber 10 passes are positioned in the gaps. The cavity resonators are supplied with frequency modulated A.C. pulses from A.C. power source 16 through pulse modulators 17. Energy pulses properly synchronized with the pulses to the resonator 15 by means of frequency comparator 18 are supplied to accelerator 13 and inflector electrode 14 through control circuit 19.

High energy particles in the outer orbits may be ejected at magnet sector 12a, and targets, probes and the like may be inserted in the gaps between the magnet sectors.

Figures 4, 5:
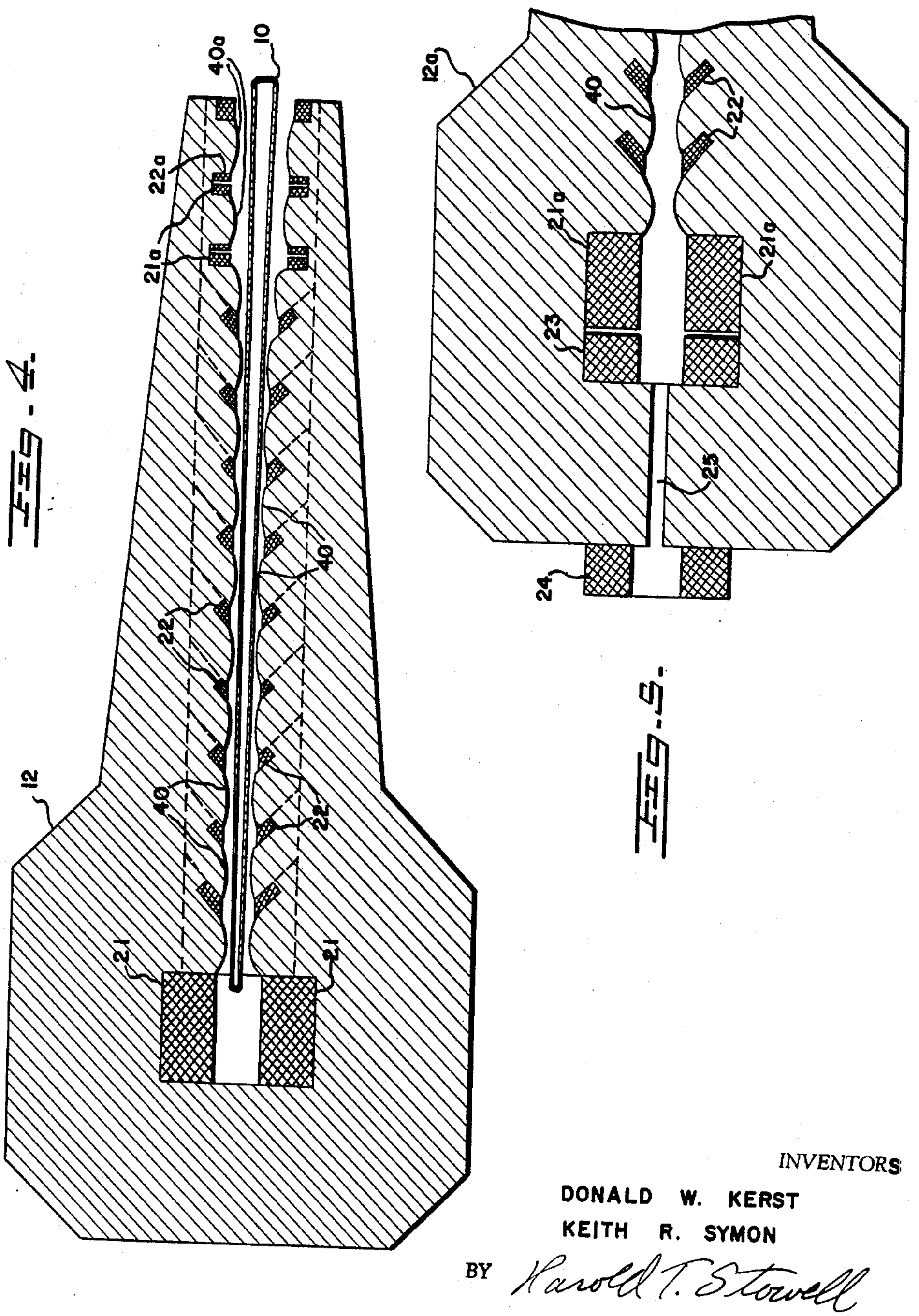
Fig. 4 is a section through a magnet sector on line 4—4 of Fig. 3.
Fig. 5 is a similar section of the outer portion of a magnet section modified for ejection of energized particles, taken on line 5—5 of Fig. 3.

Referring more particularly to Fig. 4, which shows a section through a magnet sector on a medial axial plane 21 are the main windings and 22 are the back-windings between the ridges 40 which substantially reduce the amount of flair of the pole faces which would otherwise be necessary to produce the desired high radial gradient of the field. Between the innermost ridges 40a both forward 21a and backward 22a windings are provided to compensate for the greater gap between the poles at their inner ends.

In the sector shown in Fig. 5, auxiliary ejector windings 23, 24 and an ejection slot 25 for the emergent beam are provided.

A suitable winding scheme for the back-windings 22 is shown diagrammatically in Fig. 6. Since the ridges spiral while the backwound ampere turns should not spiral very far, the conductors must be brought back across the ridges periodically, either along the radial edge of a sector as at 22' in Fig. 6a in which case the gaps between the pole faces are widened at the edge, or in the radial gaps between the magnet sectors as at 22'' in Fig. 6b. A sector is preferably sufficiently long to permit a ridge to spiral inward by one ridge width so that all of the sectors 12 will be identical in structure and winding.

The conductors to the pole face windings 22 may also be brought out successively at intervals within a sector as shown at 22''' in Figs. 7 and 7a. Smaller steps along the pole faces are required in this arrangement because a smaller number of ampere turns run radially alongside each step.

Fig. 8 shows a method of constructing and supporting the vacuum chamber 10. The chamber is formed of a membrane 50 of a non-magnetic material such as stainless steel, for example, about 0.04 inch in thickness, supported from the pole faces of the magnets by non-magnetic clamp pieces 51 bolted to the pole faces by bolts 52 and bearing against gaskets 53.

Instead of forming the ridges 40 on the pole faces, segmented iron rods of equivalent spiralled shape may be suspended from the pole faces, outside the back-wound coils, by non-magnetic, for example, brass, supporting and adjusting bolts. The rods then assume a magnetic potential depending on their position with respect to the rods and the coils. In this construction, the membrane forming the vacuum chamber 10 may be positioned between the pole faces and coils and the suspended rods or along the faces of the rods.

The following are typical design and operating data of a 20 bev. synchrotron of the type shown in Fig. 3, supplied with 5 mev. protons from a Van de Graaf accelerator:

| | At injection radius | At high energy radius |
|---|---|---|
| Proton energy | 5 Mev | 20 Bev. |
| Radius | 4,825 cm | 5000 cm. |
| Pole spacing | 8.0 cm | 4.0 cm. |

The pole faces of the magnet sectors are provided with 37 ridges spiralling from the inner to the outer radii at a rate to provide 12 ridges in a radial direction across the faces and having a flutter ratio of 1/4. The average field at the high energy orbit is 14,000 gauss and the peak field is 14,000×1.25 or 17,500 gauss which requires about 60,000 ampere turns. The total cross sectional area of the main coils is about 75 square inches.

With about 3,380 tons of iron in the magnet structure, the total weight of copper is about 154.5 tons with 1972 kilowatts of power required.

The yield of such a machine is about $10^{10}$ protons per pulse. By providing two high Q resonant cavities for RF acceleration, two pulses per second can be maintained. Each cavity is a self-contained oscillator, but the power level in each cavity may be controlled by programming plate voltages on the oscillator tubes. The cavity frequencies may be controlled by mechanically changing the cavity shape or by the modulation of a reactance tube which loads the cavity and permits trimming the frequency to the extent of about 1%.

The mechanical modulation principle is similar to that of a cloud chamber; that is, pneumatic pressure is used to reduce the cavity dimension. This pressure is released at a prescribed instant by a fast acting poppet valve, and a suitable orifice in the exhaust air line allows the subsequent motion to take place according to a reproducible schedule.

With two accelerating cavities there are two phases in the acceleration cycle:

(*a*) Power is applied to cavity I, and the frequency begins to rise, starting at about 22 mc., the 256th harmonic of the fundamental orbit frequency. At the proper instant, determined by frequency comparison with a crystal oscillator, the Van de Graaf is pulsed, and protons are injected for one turn. The cavity voltage rises from 20 kv. to 37 kv. in 0.0114 second, at which time the frequency has risen to 85 mc. The cavity voltage is now decreased to $1/e$ in about 5 $\mu$sec.

(*b*) The frequency of cavity II is compared to that of cavity I, and when the correct harmonic ratio obtains, full power is applied to cavity II. Its initial frequency should be 10.8 mc. (32nd harmonic) and peak voltage 41 kv. Cavity II rises in frequency to 36 mc. in 0.3 second. At the transition energy (about 11 bev.), the reactance tube must adjust the frequency to a precisely determined value, and must thereafter cause the resonant frequency to drop about 0.1% because of the radius increase in the FFAG. The final RF voltage is 135 kv.

Other methods for modulating the RF supply than those described above may be used, such as:

The use of rotating or vibrating capacitors associated with the cavity structure of a high Q resonant cavity to effect capacitative tuning of the cavity;

The use of a toroid coil around the orbit path to provide an encircling fluix;

The use of ferrite loading with a single high Q cavity or with a short duty phase I cavity; or The use of broad band amplifiers driving low Q, loaded cavities.

Figs. 9 and 10 show a betatron constructed in accordance with the principles of the invention. As is well known, betatron accelerators operate on the transformer principle, the stream of electrons in the annular vacuum chamber acting as a single turn secondary winding. Herebefore machines of this type have involved the application of time-varying magnetic fields resulting in a low duty cycle and consequently low intensity. The application to the betatron of the FFAG principle makes possible much higher duty cycles of 25% to 30% and correspondingly higher output intensities.

In the machine illustrated in Figs. 9 and 10 an annular vacuum chamber 60, provided with one or more vacuum pumps 61, an electron injector 62 and a target 63 is positioned in a fixed field ring of magnets 64, **64*a* the poles of which have spiral ring members 65 on or adjacent the faces thereof. The magnets are wound and energized as described in connection with the synchrotron of Figs. 3–8 to produce a field having a generally increasing strength from the inner radius to the outer radius of the orbit chamber 60** and a flutter superposed thereon in a radial and azimuthal spiral pattern.

The annular chamber and magnet ring are positioned within the continuous iron core structure 66 and a primary coil 67 supplied with alternating (for example, 60 cycle) current is wound around the central leg of the core structure. A copper shield 68, split along one or more vertical lines is preferably provided around the central leg of the core to prevent flux leakage between the core and the inner edge of the annular chamber.

The electron gun 62 is energized in sychronism with the alternating current supply to coil 67, so as to inject electrons at the low energy (inner) radius of the annular chamber 60, beginning as the accelerating flux begins to rise and continuing for about 25 to 30% of the alternating current cycle. With an injection energy of 50 kv., a maximum field strength at the outside radius of about 10,000 gauss with a spiral flutter ratio of 1/4 a maximum energy of about 100 mev. is attained. The outside radius is about 42 centimeters.

Figs. 11–13 illustrate the application of the principles of the invention to accelerators of the cyclotron type. To make particles at semi-relativistic energies circulate in a cyclotron at constant frequency and in orbits that are approximately circular it is necessary that the average magnetic field increase with radius. This gives rise to axial defocussing. This defocussing effect of the radially increasing field can be overcome by superimposing on the main magnet field a spiral flutter or ripple by means of spiral ridge members on or adjacent to the pole faces of the magnet.

This makes possible a very substantial increase in the output of cyclotrons producing protons in the energy range of 100 mev. to 500 mev. in which at present frequency modulation is required, and it is expected that energy outputs upwards of one billion electron volts can be attained, particularly by combining a relatively small amount of frequency modulation with the spirally ridged field. The spirally ridged field also improves the operation of constant frequency cyclotrons in producing protons in the energy range of 10 mev. to 50 mev. where relativistic effects begin to be troublesome.

In the cyclotron shown in Figs. 11 and 12, the conventional dees 80, 81 are mounted in evacuable chamber 82 positioned between the poles 83 of the direct current guide magnet. A suitable alternating field is applied between the electrodes 80, 81 and ions are supplied to the interelectrode space by means of ion gun 84.

Spiral ridge members 85 are applied to the pole faces to produce a spatial variation in the field strength of the order of about 25% as an orbiting particle passes over a ridge.

In operation the energization of the magnet is controlled in accordance with the usual practice in constant frequency cyclotrons to bring the orbital period of the charged ions into resonance with the frequency of the applied electric field.

In the form of the cyclotron of the invention shown in Fig. 13, the iron spiral ridges 85′ are positioned on the inner axial faces of the electrodes 80′, 81′. The other elements of the cyclotron are given primed reference numerals to correspond with the same elements in Fig. 11. In this construction the gap can be larger and a higher voltage can be put on the dees.

The following are typical design and construction data for a spirally ridged cyclotron of the invention having an output energy of about 460 mev.: The average field at the high energy (outside) radius is about 14,000 gauss and the gap at the outside radius is about 18.6 centimeters. The radial separation of the ridges is about 62 centimeters at the outside radius becoming gradually less as they spiral and taper in toward the center. The radius of the high energy orbit is about 242 centimeters. The frequency of applied accelerating electric field is about 10 megacycles per second. The voltage of the accelerating field is made as high as possible to reduce the possibility of the particles getting out of synchronization with the high frequency oscillations due to slight errors in the field. 100 kv. to ground on the dees would give full acceleration of the particles in about 2500 revolutions since 200 kv. would be gained on each revolution. With the spiral ridges mounted on the inside of the dees, as shown in Fig. 13, the gap can be made larger and a higher voltage can be put on the dees. It is also possible to embed an R.F. cavity in the poles between the ridges to eliminate the voltage insulation difficulty.

The invention has been more particularly described for the purpose of illustrating the principles of the invention with respect to embodiments in which the focussing fields are magnetic. However, electric focussing fields may also be used by applying electric potentials between field electrodes shaped and positioned similarly in principle to the field pole members described in the foregoing.

While in the particular embodiments described above the focussing field is maintained constant, the effect of the field forms obtained with the field producing means of the invention in greatly reducing the radial spread of the orbits of particles over a wide range of energies can be effectively utilized with pulsed fields with the result of very substantially decreasing the pulse amplitude required. This would be particularly important in improving the operation of existing particle accelerating machines. For example, in the case of a betatron requiring a magnetic field rise by a factor of about one thousand during acceleration when operated as a purely pulsed betatron, replacement of the conventional magnet system by spirally ridged magnets of the type illustrated in Figs. 9 and 10, could readily increase the spread in momentum of the orbitting electrons by a factor of 3. The amplitude of the field pulses applied to the magnets could be decreased to one-third that required in the present machines, which represents a very substantial and important decrease in the amount of pulsed electric energy which must be handled.

We claim:

1. Apparatus for imparting energy to charged particles comprising a source of charged particles, an evacuable vessel providing an orbital path for particles from said source, means providing a time-invariant focussing field in said path having a spatial gradient which varies periodically radially and in azimuth in a spiral pattern to maintain said particles within said path in spite of their changing energy, and means for impressing a time-variant electric field on the particles in said path.

2. Apparatus for imparting energy to charged particles comprising a source of charged particles, an evacuable vessel providing an orbital path for particles from said source, a magnetic system effective to produce a time-invariant magnetic flux linking said path and having a spatial gradient which varies periodically radially and in azimuth in a spiral pattern to maintain said particles within said path in spite of their changing energy, and means for impressing a time-variant electric field on the particles in said path.

3. Apparatus for imparting energy to charged particles comprising a source of charged particles, an evacuable vessel providing an orbital path for particles from said source, a magnetic system effective to produce a time-invariant magnetic flux linking said path and having a spatial gradient which varies periodically radially and in azimuth in a spiral pattern to maintain said particles within said path in spite of their changing energy, and means for impressing an alternating electric field on the particles in said path.

4. Apparatus for imparting energy to charged particles comprising a source of charged particles, an evacuable vessel providing an orbital path for particles from said source, a magnetic system effective to produce a time-invariant magnetic flux linking said path and having a spatial gradient which varies periodically radially and in azimuth in a spiral pattern to maintain said particles within said path in spite of their changing energy, and means for impressing a frequency-modulated alternating electric field on the particles in said path.

5. Apparatus for imparting energy to charged particles comprising a source of charged particles, an evacuable vessel providing a circular orbital path for particles from said source, a magnetic system effective to produce a time-invariant magnetic flux linking said path and having a spatial gradient which varies periodically radially and in azimuth in a spiral pattern to maintain said particles within said path in spite of their changing energy, and means for impressing an alternating electric field on the particles in said path.

6. Apparatus for imparting energy to charged particles comprising a source of charged particles, an evacuable vessel providing an annular orbital path for particles from said source, a magnetic system effective to produce a time-invariant magnetic flux linking said path and having a spatial gradient which varies periodically radially and in azimuth in a spiral pattern to maintain said particles within said path in spite of their changing energy, and means for impressing a frequency-modulated alternating electric field on the particles in said path.

7. Apparatus for imparting energy to charged particles comprising a source of charged particles, an evacuable vessel providing an annular orbital path for particles from said source, means for injecting successive pulses of charged particles from said source into said path, a magnetic system effective to produce a time-invariant magnetic flux linking said path and having a spatial gradient which varies periodically radially and in azimuth in a spiral pattern to maintain said particles within said path in spite of their changing energy, and means for impressing a frequency-modulated alternating electric field on the particles in said path in synchronism with said pulses.

8. Apparatus as defined in claim 2 wherein the magnetic system comprises a plurality of magnets positioned about said evacuable vessel with the pole legs of the magnets extending radially inward with said orbital path therebetween and spiral ridge elements on said pole faces spiralling radially thereon.

9. Apparatus as defined in claim 8 wherein the spiral ridge elements are fixed to the pole faces.

10. Apparatus as defined in claim 8 wherein the spiral ridge elements are positioned adjacent the pole faces.

11. Apparatus as defined in claim 8 wherein the magnets have main energizing windings positioned adjacent the outer radial edge of said path.

12. Apparatus as defined in claim 11 wherein the radially inward extending legs of said magnets are back-wound with respect to the main windings to effect a reduction of the magnetic field strength in the radially inward direction.

13. A particle accelerator of the cyclotron type wherein the pole faces of the particle guide magnet include spiral ridge elements spiralling radially thereon.

14. A particle accelerator as defined in claim 13 wherein the spiral ridge elements are fixed to the pole faces.

15. A particle accelerator as defined in claim 13 wherein the spiral ridge elements are positioned adjacent the pole faces.

References Cited in the file of this patent

UNITED STATES PATENTS

| | | |
|---|---|---|
| 1,645,304 | Slepian | Oct. 11, 1927 |
| 2,639,401 | Skellett | May 19, 1953 |
| 2,736,799 | Philos | Feb. 28, 1956 |
| 2,738,421 | Westendorp | Mar. 13, 1956 |